(12) United States Patent
Olin

(10) Patent No.: US 6,614,559 B2
(45) Date of Patent: Sep. 2, 2003

(54) METHOD AND SYSTEM FOR ROUTING INCOMING FILES

(75) Inventor: Gregg R. Olin, Fairport, NY (US)

(73) Assignee: X/Net Associates, Fairport, NY (US)

( * ) Notice: Subject to any disclaimer, the term of this patent is extended or adjusted under 35 U.S.C. 154(b) by 0 days.

(21) Appl. No.: 09/432,903

(22) Filed: Nov. 2, 1999

(65) Prior Publication Data

US 2002/0018242 A1 Feb. 14, 2002

Related U.S. Application Data

(60) Provisional application No. 60/107,071, filed on Nov. 4, 1998.

(51) Int. Cl.[7] ................................................ H04N 1/00
(52) U.S. Cl. ................. 358/403; 358/402; 358/1.15; 379/100.08; 709/239
(58) Field of Search ................. 358/402, 403, 358/407, 442, 443, 449, 468, 1.15, 1.17; 709/204, 206, 238, 239, 244; 379/100.01, 100.08, 100.09

(56) References Cited

U.S. PATENT DOCUMENTS

| | | | | |
|---|---|---|---|---|
| 4,581,656 A | * | 4/1986 | Wada | 358/426 |
| 4,797,706 A | * | 1/1989 | Sugishima et al. | 358/300 |
| 5,084,770 A | | 1/1992 | Nakayama | |
| 5,287,194 A | | 2/1994 | Lobiondo | |
| 5,455,687 A | * | 10/1995 | Fukui et al. | 358/438 |
| 5,548,789 A | * | 8/1996 | Nakanura | 709/206 |
| 5,606,685 A | * | 2/1997 | Frandeen | 711/117 |
| 5,633,731 A | * | 5/1997 | Maemura | 358/468 |
| 5,754,778 A | | 5/1998 | Shoujima | |
| 5,892,587 A | | 4/1999 | Okada et al. | |
| 5,905,783 A | * | 5/1999 | Tonegawa | 379/100.07 |
| 5,970,222 A | * | 10/1999 | Gusmano et al. | 358/1.16 |
| 5,974,414 A | | 10/1999 | Stanczak et al. | |
| 6,124,942 A | * | 9/2000 | Ichinowatari | 358/1.17 |
| 6,211,972 B1 | * | 4/2001 | Okutomi et al. | 358/402 |

* cited by examiner

Primary Examiner—Madeleine Nguyen
Assistant Examiner—Joseph R. Poxrzywa
(74) Attorney, Agent, or Firm—Nixon Peabody LLP

(57) ABSTRACT

A method for routing one or more files includes determining how many pages are in an incoming file to obtain a first number of pages and how many pages of existing files are already at a one work station to obtain a second number of pages, adding the first and second numbers of pages together to get a total number of pages, and then routing the incoming file to the one work station if the total number of pages is less than or equal to a upper limit of pages.

33 Claims, 2 Drawing Sheets

METHOD AND SYSTEM FOR ROUTING INCOMING FILES

This application claims the benefit of U.S. Provisional Patent Application Ser. No. 60/107,071 filed on Nov. 4, 1998 which is herein incorporated by reference.

FIELD OF THE INVENTION

This invention relates generally to a method and system for routing files and, more particularly, to a method and system for routing incoming facsimiles to one or more work stations based upon the page count for the incoming facsimile and the page count for facsimiles already at each of the work stations.

BACKGROUND OF THE INVENTION

In a variety of different situations, files containing one or more pages of data are transmitted to a centralized location for processing. Typically, the files received at the centralized location are distributed between work stations for processing. For example, automotive dealers routinely transmit completed automotive loan forms to a bank for processing. The bank receives these forms and then routes them to one or more work stations to be processed.

Automated routing systems have been developed to distribute files between work stations as they are received. Typically, these automated systems operate by distributing an equal number of files between each of the work stations. Although these routing systems work, there are a number of problems or drawbacks.

One of the main problems with these prior systems is that they do not provide an equal distribution of the work load because they do not take into account the fact that the size of each of the files can vary. For example, some of the files may have only one or two pages of data, while others have three, four, or more pages of data. Since page counts for the files are not taken into account, two work stations may have received the same number of files, but may have dramatically different numbers of pages of data to process. As a result, the overall efficiency of the processing system is reduced because some work stations may have available time while other are being overworked.

Another problem with these systems is that they are unable to dynamically control the distribution of files between work stations. For example, these prior systems can not transmit only small files to one work station which may be a training station while transmitting larger files to more experienced work stations.

Yet another problem with these prior systems is that they are unable to recognize when a file is "trapped" at a work station for an extended period of time without processing. In these prior systems, once the files are sent the system does not keep track of the files and is not designed to be able to reclaim any of the files. As a result, files can be tied up at a work station for an unnecessarily long period of time.

SUMMARY OF THE INVENTION

A method in accordance with one embodiment of the present invention includes: determining how many pages are in an incoming file to obtain a first number of pages; determining how many pages of existing files are already at one of a plurality of work stations to obtain a second number of pages; adding the first number of pages to the second number of pages to get a total number of pages; and routing the incoming file to the one work station if the total number of pages is less than or equal to a upper limit of pages.

A method in accordance with another embodiment of the present invention includes: determining how many pages of existing files are already at one of a plurality of work stations to obtain a second number of pages; adding the first number of pages to the second number of pages to get a total number of pages; determining if the incoming file is from the one work station; and routing the incoming file to the one work station if the total number of pages is less than or equal to a upper limit of pages and the incoming file is not from the one work station.

A method in accordance with another embodiment of the present invention includes: determining how many of a plurality of work stations are online; determining how many of the work stations in the set of work stations that are on-line are available; selecting one work station from the plurality of work stations that are on-line and available; determining how many pages are in an incoming file to obtain a first number of pages; determining how many pages of existing files are already at one of a plurality of work stations to obtain a second number of pages; adding the first number of pages to the second number of pages to get a total number of pages; and routing the incoming file to the one work station if the total number of pages is less than or equal to a upper limit of pages.

A method in accordance with another embodiment of the present invention includes: receiving one or more unrouted files; selecting an incoming file from the one or more unrouted files; determining how many pages are in the incoming file to obtain a first number of pages; determining how many pages of one or more existing files are already at one of a plurality of work stations to obtain a second number of pages; adding the first number of pages to the second number of pages to get a total number of pages; routing the incoming file to the one work station if the total number of pages is less than or equal to a upper limit of pages; reclaiming the incoming file from the one work station when a reclaiming period of time has expired and the incoming file has not been processed at the one work station; and treating the reclaimed incoming file like the one or more unrouted files.

An apparatus in accordance with another embodiment of the present invention includes: means for determining how many pages are in the incoming file to obtain a first number of pages; means for determining how many pages of existing files are already at a selected one of the work stations to obtain a second number of pages; means for adding the first number of pages to the second number of pages to get a total number of pages; and means for routing the incoming file to the selected work station if the total number of pages is less than or equal to a upper limit of pages.

With the present invention a more even distribution of work among work stations is possible. More specifically, the present invention counts the number of pages of files being sent to each work station, instead of the number of files without regard to their size. Additionally, with the page counts the present invention can provide more dynamic control over where a particular file is sent. As a result, the present invention is more efficient than prior systems and methods.

Additionally, the present invention includes a unique feature where the method and system is able to recognize and prevent the same file or document from continually being resent to the same location when it has been initially rejected by the work station. The present invention also keeps track of a a recycle period of time so that the work station may once again reconsider the file or document for processing once the recycle time period has expired and the work load at the work station may have been reduced.

The present invention also provides a unique system for checking to see which work stations are on-line and available. With the present invention, the availability of each work station is determined based upon a low water mark. A high water mark is then used to determine if the particular file or document can be accepted by that particular work station. Again, this helps to more efficiently distribute files among the work stations.

Further, the present invention provides a unique way to reclaim files from inactive work stations. Unlike prior systems, with the present invention if a file or other document is at a particular work station for longer than a reclaim period of time without processing, then the system reclaims the file or other document and redistributes it to an available work station.

DETAILED DESCRIPTION

Figure 1:
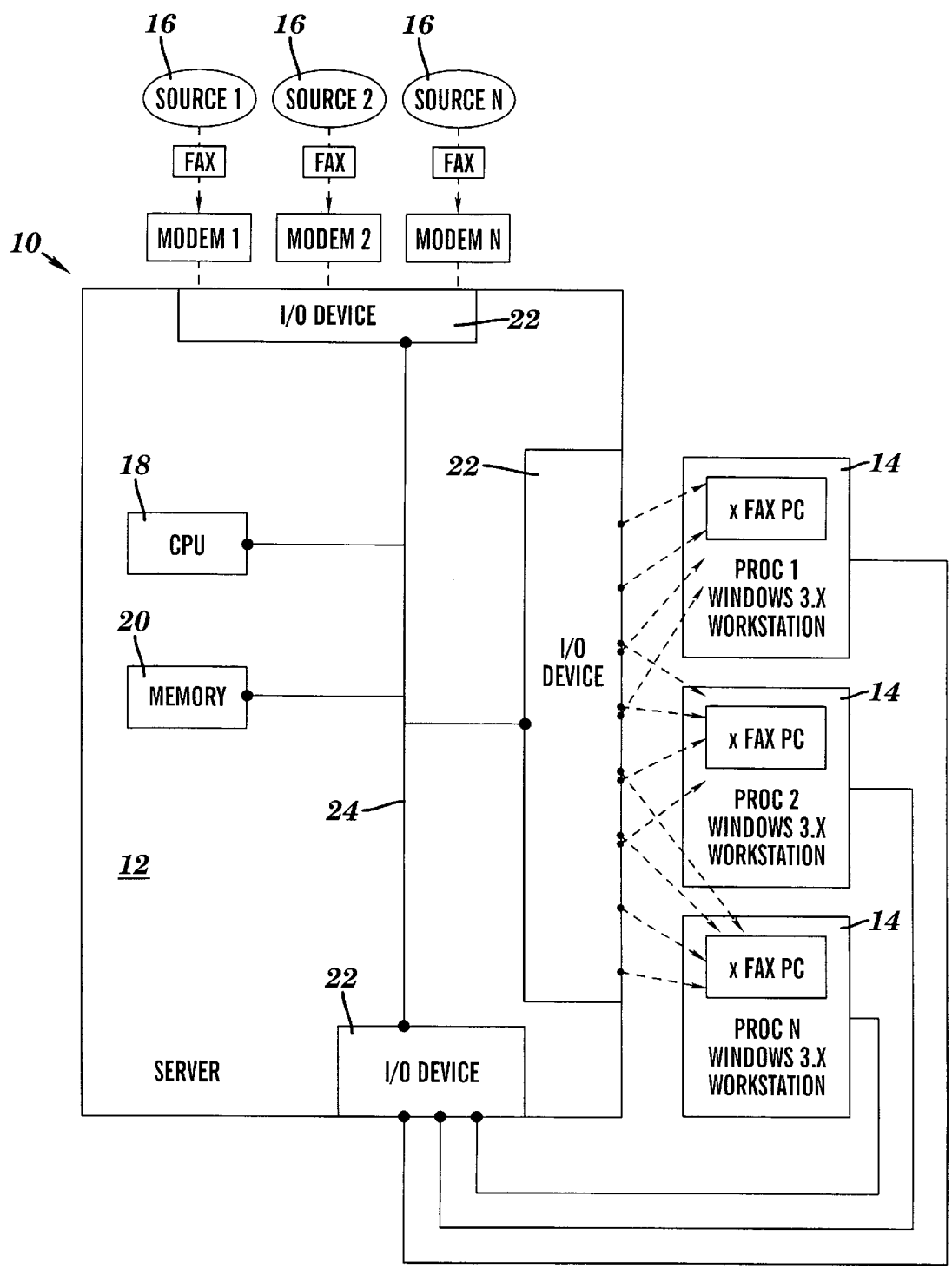
FIG. 1 is a block diagram of a system for routing incoming files in accordance with one embodiment of the present invention.

A system 10 for routing an incoming file or document in accordance with one embodiment of the present invention is illustrated in FIG. 1. The system 10 includes a file router 12 and a plurality of work or processing stations 14 for distributing one or more incoming files from a plurality of file sources 16. The method includes determining how many pages are in an incoming file to obtain a first number of pages and how many pages of existing files are already at a one work station 14 to obtain a second number of pages, adding the first and second numbers of pages together to get a total number of pages, and then routing the incoming file to the one work station 14 if the total number of pages is less than or equal to a upper limit of pages. The present invention provides a number of advantages including providing a more even distribution of files among work stations 14, preventing the same file from continually being resent to the same location when it has been initially rejected by the work station 14 until a recycle period of time has expired, providing a unique system for checking to see which work stations 14 are on-line and available, and providing a unique way to reclaim files from inactive work stations 14 after a reclaim period of time has expired when the file has not been processed.

Referring more specifically to FIG. 1, in this particular embodiment the file router 12 comprises a server which includes a central processing unit 18, at least one memory device 20, input/output (I/O) devices 22, and an internal bus 24 coupling the components together. Since the components of a server and how they operate are well known to one of ordinary skill in the art, they will not be discussed here. Although in this particular embodiment the file router 12 is a server, other types of systems, such as a programmable computer, can be used as the file router 12. The program stored in the memory device 20 and run by the server 12 to route files is illustrated in the attached drawings and described herein.

The file router 12 monitors and stores in memory 20 signals which represent the number of pages of data from existing files already at each work station 14, the existing files and thus the number of pages that have been processed by each work station 14 and transmitted back to the file router 12, and whether each work station 14 has signaled that it is in a pause mode. Additionally, the file router 12 monitors and stores in memory signals which represent whether a particular file has been transmitted back to the file router 12 from a work station 14 before processing. The file router 12 also monitors whether a recycle period of time for the work station 14 and that particular file have expired. Until the recycle period of time has expired, the file router 12 will not transmit a file back to a work station 14 that has recycled the file. The file router 12 also keeps track of a reclaim period of time for each file transmitted to a work station 14 so that the file router can reclaim any files from the work stations that are not processed before the reclaim time period expires for that file.

When the file router 12 receives an incoming file, the file router 12 determines and stores signals in memory 20, which represent the number of pages in the incoming file as well as the incoming file. The file router 12 may also convert the incoming file into another format in a manner well known to those of ordinary skill in the art.

In this particular embodiment, the file router 12 stores information signals about the source of the file and the file itself, stores file location signals that indicate to which work station each file has been sent, and generates and monitors a reclaim period of time for each file transmitted to a work station and a recycle period of time for each file rejected and sent back to the file router. The reclaim and recycle operations will be described in greater detail below.

A plurality of file sources 16 are coupled to the file router 12 to transmit files for routing and ultimately processing. In this particular embodiment, the file sources 16 are facsimile machines, although other types of file sources 16, such as a computer which includes a central processing unit, at least one memory device, input/output devices, and an internal bus coupling the components together, could also be used. In this particular embodiment, the incoming files are transmitted as data signals from the file sources 16 to the file router 12 via phone lines and modems, although other methods for transmitting data, such as via the internet or with other networked connections, can also be used. Additionally, in this particular embodiment the incoming files comprise data signals that represents facsimiles and include a designation in the data signals which indicate where the data is to be broken up into one or more pages, such as a conventional or standardized eight-and-one-half inch by eleven inch page, although the files can comprise other types of data, such as other types of electronic documents, and the files can be divided up in different ways, such as with different page sizes or in other formats.

A plurality of work stations 14 are coupled to the file router 12 to receive files for processing. In this particular embodiment, the work stations 14 are also computers which include a central processing unit, at least one memory device, input/output devices, and an internal bus coupling the components together, although other types of work stations 14 could also be used. Again, since the components of a computer and how they operate are well known to one of ordinary skill in the art, they will not be discussed here. The file router 12 transmits data signals which represent the files to the work stations 14 which the file router 12 has determined to be on-line and available as described in greater detail below. In this particular embodiment, the files are transmitted from the file router 12 to the work stations 14 as data signals via an internal network coupling the file router 12 and the work stations 14 together, although other methods for transmitting data, such as via the internet or phone lines, can also be used. The work stations 14 can also transmit the files back to the file router 12 once they have been processed, if they are reclaimed or if the files are rejected by that particular work station 14 and are sent back to be recycled to another work station 14, e.g. the operator at that particular work station 14 may not be trained to handle a particular type of file and may send that file back to get routed to another work station 14 trained for that type of file. Additionally, in this particular embodiment each of the work stations 14 can designate a file with a discard or delete signal indicating that the file needs to be deleted and can transmit the file with the discard signal back to the file router 12. Further, in this particular embodiment the work stations 14 can transmit an on-line signal when each work station 14 is on and ready to accept files for processing and a pause signal when a particular work station 14 will be temporarily shut down, e.g. for an operator break.

Each work station 14 also has a high water mark which designates the maximum number of pages that can be handled by that work station 14 and a low water mark which designates the number of pages that the work station 14 can have and still be considered to be available. One of the advantages of the present invention is that the high and low water marks can be customized for each work station 14. These high and low water marks for pages are typically stored as high and low signals for each work station 14 in the memory 20 of the file router 12, although they could be stored elsewhere, such as in the memory of the work station 14. Although in this particular embodiment the high and low water marks must be less than or equal to to trigger certain operations, other triggering levels can be used.

Figure 2:
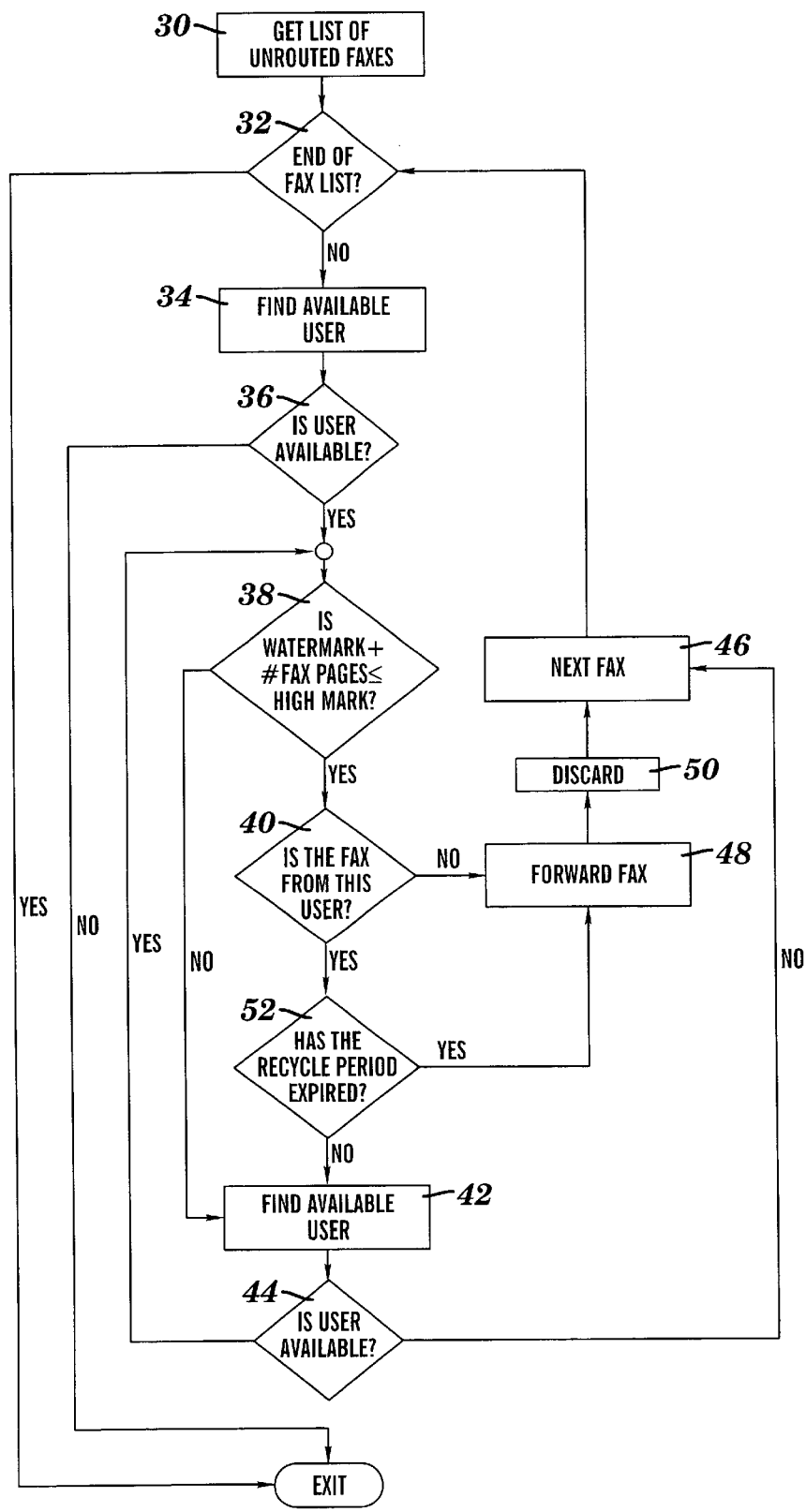
FIG. 2 is a flowchart of a method for routing an incoming file in accordance with one embodiment of the present invention.

The operation of the method and system 10 for routing incoming files in accordance with one embodiment of the present invention will be discussed with reference to FIG. 2. First, a file source 16, such as a facsimile machine at an automotive dealer, is used to transmit a file, such as a loan application, to the file router 12, such as a dedicated server at a bank. In this particular embodiment, the file from the file source 16 is received and converted into an appropriate format for processing by the file router 12, although the file could be transmitted in a format that is ready for distribution once received by the file router 12. The file router 12 also creates and stores data in memory 20 about the source of the file and the file itself.

Accordingly, in step 30 the unrouted files begin to be received by and are stored at the file router 12. If none of the work stations 14 are on-line and available, the file router 12 generates a list of unrouted files and stores the unrouted files. Typically, the files are initially routed in a first-in-first-out procedure, although other methods for determining the order of distribution for routing can be used. In step 32, if the file router 12 does not have any unrouted files, then the YES branch is taken and the file router 12 exits the routing operation. If the file router 12 does have at least one unrouted file, then the NO branch is taken in step 32.

Next, in steps 34 and 36 the file router 12 identifies a work station 14 (referred to as a user in FIG. 2) that is on-line and available. The file router 12 scans its stored database in memory 20 looking for work stations 14 that have transmitted a signal or have otherwise indicated to the file router 12 that they are on-line and that they meet the criteria described below to indicate that they are available to accept an incoming file. In this particular embodiment, a work station 14 is available if the number of pages of a file or files already transmitted to the work station 14 are at or below a low water mark for pages for that work station 14. By way of example only, a work station 14 may have a low water mark of four pages. As a result, that particular work station 14 will be deemed available by the file router 12 if that work station 14 already has four or less pages of files. Accordingly, if the number of pages of a file or files already transmitted to the work station or stations 14 is or are all above the low water mark, then the NO branch is taken to exit the operation and the file router 12 records information about and stores the unrouted files until a work station 14 comes on-line and is deemed available. If the number of pages of a file or files already transmitted to a work station 14 is below the low water mark, then the YES branch is taken to step 38 and that work station 14 is deemed available.

In step 38, the selected work station 14 can accept an incoming file whose page count combined with the page count for the file or files already at the work station 14 does not exceed the high water mark for pages for that particular work station 14. By way of example, a work station 14 may have a high water mark of ten pages. As a result, if that particular work station 14 already has three pages of files, then it can accept an incoming file that has up to seven pages. If the page count of the file or files at the work station 14 combined with the page count of the incoming file is less than or equal to the high water mark for pages at the work station 14 then the YES branch is taken to step 40.

If the page count of the file or files at the work station 14 combined with the page count of the incoming file is greater than the high water mark for pages at the work station 14 then the NO branch is taken from step 38 and the file router 12 goes to steps 42 and 44 and looks for an available work station 14 using the same process to determine the availability of a work station 14 described earlier with reference to steps 34 and 36. If another work station 14 is deemed to be available, then the YES branch is taken from step 44 back to step 38 If another work station 14 is not available, then the NO branch is taken from step 44 to step 46 and then step 32 discussed earlier. In step 46, the file router 12 selects the next unrouted file. If it is the end of the file list and there are no more files to be routed, then the YES branch is taken from step 32 and the file router 12 exits operations. If it is not the end of the file list and there is at least one more file to be routed, then the NO branch is taken from step 32 and the file router proceeds to steps 34 and 36 as discussed earlier.

Returning to step 38, if the YES branch was taken then in step 40 the file router 12 checks to see if the file to be routed has already been rejected and sent back for recycling by this work station 14. This step prevents a work station 14 from immediately receiving a file that was just forwarded back to the file router 12 by that work station 14. Accordingly, if the file to be routed has not already been rejected and sent back for recycling by this work station 14, then the NO branch is taken to step 48.

In step 48, the file is forwarded to the work station 14 for processing and a new page count for the number of pages at that work station 14 is created and stored in memory 20 of file router 12. As each of the work stations 14 process files, the files are transmitted back to the file router 12 and the page count for the number of pages of files at each work station 14 are reduced accordingly. In step 50, each work station 14 can designate a file with a discard or delete signal, if appropriate, and can transmit the files with the discard signal back to the file router 12 so the file can be discarded. In this particular embodiment, the file router 12 automatically deletes files with a discard signal to save time, although the files can be stored in a memory queue to be reviewed by an administrator before being deleted. The work stations 14 may also be designed to simply delete these files and signal the file router 12 that the particular file was deleted. Following step 50, in step 46 the file router 12 selects the next file to be routed as described earlier.

Going back to step 40, if the file to be routed has already been rejected and sent back to the file router 12 by this work station 14 then the YES branch is taken to step 52. In step 52, the file router 12 determines whether or not a recycle period of time for that particular file for that particular work station 14 has expired. The recycle period of time can vary as needed for the particular applications. By way of example only, assume the recycle period of time is set at five minutes. If a work station 14 has rejected and sent a file back to the file router 12, the file router 12 will not forward that file back to that work station 14 until the recycle period of time, five minutes in this example, had expired. The recycle period of time provides the work station 14 time to either exit the system or to process other files before that work station 14 becomes eligible to receive that same file again.

Accordingly, if the recycle period of time has expired, then the YES branch in step 52 is taken to step 48 which has been discussed earlier. If the recycle period of has not expired, then the NO branch is taken in step 52 to step 42 which has also been discussed earlier.

When the file router 12 forwards a file to a work station 14 the file router 12 may also start and being to monitor a reclaim period of time for that particular file and that particular work station 14. The reclaim period of time can vary as needed for the particular application. If the reclaim period of time expires before the work station 14 has signaled the file router 12 that the file has been processed, then the file router 12 may reclaim the file and reroute the file to another work station 14 or store it in memory until a work station 14 is on-line and available. This helps to prevent files from sitting at any one particular work station 14 for an extended period of time without processing and thus improves the overall efficiency of the method and system.

By way of example only, assume a work station 14 has been forwarded three files and then the work station 14 loses power or crashes from using another program. At this time, the three files are still routed or assigned to that work station 14, even though that work station 14 is no longer on-line. If the work station 14 could not restart until the next day, then those three files would not be processed on the day that they were received. With the reclaim feature, the file router 12 would automatically reclaim those files after the reclaim period of time had expired and would transmit them to other work stations 14 for processing that same day. If the work station 14 that crashed, but was able to get back on-line before the recycle period of time had expired, then that work station 14 could still process those files.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for routing an incoming file, the method comprising:

determining how many pages are in the incoming file to obtain a first number of pages of a current transfer session;

determining how many pages are in existing files already at one or more of a plurality of work stations to obtain a second number of pages, the existing files each having been transmitted during at least one earlier transfer session;

adding the first number of pages to the second number of pages to get a total number of pages for the one or more work stations;

determining which of the one or more work stations are on-line;

determining which of the work stations that are on-line are available, wherein each work station is determined to be available if a number of the existing pages already at the work station is less than or equal to a lower limit of pages for the work station; and routing the incoming file to one of the work stations determined to be on-line and available if the total number of pages is less than or equal to an upper limit of pages.

2. The method as set forth in claim 1 further comprising finding another work station if the total number of pages is greater than the upper limit of pages.

3. The method as set forth in claim 1 further comprising determining if the incoming file is from the one work station, wherein the incoming file is routed to the one work station if the total number of pages is less than or equal to the upper limit of pages and the incoming file is not from the one work station.

4. The method as set forth in claim 3 further comprising determining if a recycle period of time has expired, wherein the incoming file is routed to the one work station if the total number of pages is less than or equal to the upper limit of pages, the incoming file is from the one work station, and the recycle period of time has expired.

5. The method as set forth in claim 4 further comprising finding another work station if the total number of pages is less than or equal to the upper limit of pages, the incoming file is from the one work station, and the recycle period of time has not expired.

6. The method as set forth in claim 1 further comprising:

reclaiming at least one of the existing files from the one work station when a reclaiming period of time has expired and the at least one existing file has not been processed at the one work station; and treating the reclaimed existing file like the incoming file.

7. The method as set forth in claim 1 further comprising:

marking the incoming file at one of the work stations with a discard designation if the incoming file needs to be discarded; and discarding any of the incoming files with the discard designation.

8. The method as set forth in claim 1 wherein the existing files further comprise one or more separate files previously transmitted to the one work station during the at least one earlier transfer session.

9. The method as set forth in claim 1 wherein each earlier transfer session further comprises previously transmitting one or more separate files to the one work station.

10. A method for routing an incoming file comprising:

determining how many pages are in the incoming file to obtain a first number of pages of a current transfer session;

determining how many pages of existing files are already at one or more of a plurality of work stations to obtain a second number of pages, the existing files each having been transmitted during at least one earlier transfer session;

adding the first number of pages to the second number of pages to get a total number of pages for the one or more work stations;

determining which of the one or more work stations are on-line;

determining which of the work stations that are on-line are available, wherein each work station is determined to be available if a number of the existing pages already at the work station is less than or equal to a lower limit of pages for the work station;

determining if the incoming file is from one of the work stations; and routing the incoming file to one of the work stations determined to be on-line and available if the total number of pages is less than or equal to a upper limit of pages and the incoming file is not from the one work station.

11. The method as set forth in claim 10 further comprising determining if a recycle period of time has expired, wherein the incoming file is routed to the one work station if the total number of pages is less than or equal to the upper limit of pages, the incoming file is from the one work station, and the recycle period of time has expired.

12. The method as set forth in claim 10 further comprising:

reclaiming at least one of the existing files from the one work station when a reclaiming period of time has expired and the at least one existing file has not been processed at the one work station; and treating the reclaimed existing file like the incoming file.

13. The method as set forth in claim 10 further comprising:

marking the incoming file at one of the work stations with a discard designation if the incoming file needs to be discarded; and discarding any of the incoming files with the discard designation.

14. The method as set forth in claim 10 wherein the existing files further comprise one or more separate files previously transmitted to the one work station during the at least one earlier transfer session.

15. The method as set forth in claim 10 wherein each earlier transfer session further comprises previously transmitting one or more separate files to the one work station.

16. A method for routing an incoming file comprising:

determining how many of a plurality of work stations are on-line;

determining how many of the work stations in the plurality of work stations that are on-line are available;

selecting one work station from the plurality of work stations that are on-line and available;

determining how many pages are in the incoming file to obtain a first number of pages of a current transfer session;

determining how many pages of existing files are already at one of a plurality of work stations to obtain a second number of pages, the existing files each having been transmitted during at least one earlier transfer session;

adding the first number of pages to the second number of pages to get a total number of pages; and routing the incoming file to the one work station if the total number of pages is less than or equal to an upper limit of pages.

17. The method as set forth in claim 16 wherein each of the work stations is determined to be available if the total number of pages is less than a lower limit of pages for the work station.

18. The method as set forth in claim 16 further comprising:

determining if the incoming file is from the one work station; and determining if a recycle period of time has expired, wherein the incoming file is routed to the one work station if the total number of pages is less than or equal to the upper limit of pages, the incoming file is from the one work station, and the recycle period of time has expired.

19. The method as set forth in claim 16 further comprising:

reclaiming at least one of the existing files from the one work station when a reclaiming period of time has expired and the at least one existing file has not been processed at the one work station; and treating the reclaimed existing file like the incoming file.

20. The method as set forth in claim 16 further comprising:

marking the incoming file at one of the work stations with a discard designation if the incoming file needs to be discarded; and discarding any of the incoming files with the discard designation.

21. The method as set forth in claim 16 wherein the existing files further comprise one or more separate files previously transmitted to the one work station during the at least one earlier transfer session.

22. The method as set forth in claim 16 wherein each earlier transfer session further comprises previously transmitting one or more separate files to the one work station.

23. A method comprising:

receiving one or more unrouted files;

selecting an incoming file from the one or more unrouted files;

determining how many pages are in the incoming file to obtain a first number of pages of a current transfer session;

determining how many pages of one or more existing files are already at one or more of a plurality of work stations to obtain a second number of pages, the existing files each having been transmitted during at least one earlier transfer session;

adding the first number of pages to the second number of pages to get a total number of pages for the one or more work stations;

determining which of the one or more work stations are on-line;

determining which of the work stations that are on-line are available, wherein each work station is determined to be available if a number of the existing pages already at the work station is less than or equal to a lower limit of pages for the work station;

routing the incoming file to one of the work stations determined to be on-line and available if the total number of pages is less than or equal to an upper limit of pages;

reclaiming the incoming file from the one work station determined to be on-line and available when a reclaiming period of time has expired and the incoming file has not been processed at the one work station; and treating the reclaimed incoming file like the one or more unrouted files.

24. The method as set forth in claim 23 further comprising:

determining if the incoming file is from the one work station; and determining if a recycle period of time has expired, wherein the incoming file is routed to the one work station if the total number of pages is less than or equal to the upper limit of pages, the incoming file is from the one work station, and the recycle period of time has expired.

25. The method as set forth in claim 23 further comprising:

marking the incoming file at one of the work stations with a discard designation if the incoming file needs to be discarded; and discarding any of the incoming files with the discard designation.

26. The method as set forth in claim 23 wherein the existing files further comprise one or more separate files previously transmitted to the one work station during the at least one earlier transfer session.

27. The method as set forth in claim 23 wherein each earlier transfer session further comprises previously transmitting one or more separate files to the one work station.

28. An apparatus for routing an incoming file to one of a plurality of work stations comprising:

a page determining unit determining how many pages are in the incoming file to obtain a first number of pages of a current transfer session;

an existing file determining unit determining how many pages of existing files are already at a selected one of the work stations to obtain a second number of pages, the existing files each having been transmitted during at least one earlier transfer session;

an adding unit adding the first number of pages to the second number of pages to get a total number of pages;

a work station status unit determining which of the plurality of work stations are on-line; and a selecting unit selecting the selected work station from the work stations that are on-line;

an availability determining unit determining which of the work stations that are on-line are available, wherein the selected work station is selected from the work stations that are on-line and available, wherein the availability determining unit determines that each of the work stations is available if the total number of pages is less than a lower limit of pages for the work station; and a file router routing the incoming file to the selected work station determined to be on-line and available if the total number of pages is less than or equal to an upper limit of pages.

29. The apparatus as set forth in claim 28 further comprising a file sending determination unit determining if the incoming file is from the selected work station, wherein the incoming file is routed to the selected work station if the total number of pages is less than or equal to the upper limit of pages and the incoming file is not from the selected work station.

30. The apparatus as set forth in claim 29 further comprising a recycle period determining unit determining if a recycle period of time has expired, wherein the incoming file is routed to the selected work station if the total number of pages is less than or equal to the upper limit of pages, the incoming file is from the selected work station, and the recycle period of time has expired.

31. The apparatus as set forth in claim 28 further comprising:

a file reclaiming unit reclaiming at least one of the existing files from the selected work station when a reclaiming period of time has expired and the at least one existing file has not been processed at the selected work station; and the apparatus for routing treating the reclaimed existing file like the incoming file.

32. The apparatus as set forth in claim 28 wherein the existing files further comprise one or more separate files previously transmitted to the one work station during the at least one earlier transfer session.

33. The apparatus as set forth in claim wherein each earlier transfer session further comprises previously transmitting one or more separate files to the one work station.

* * * * *